INVENTOR
Raymond J. Theriault.
BY John P. Tarbot
ATTORNEY

March 27, 1951 R. J. THERIAULT 2,546,839
REINFORCING STRUCTURE FOR VEHICLE BODIES,
ESPECIALLY FOR RAILWAY CARS
Filed March 31, 1945 4 Sheets-Sheet 2
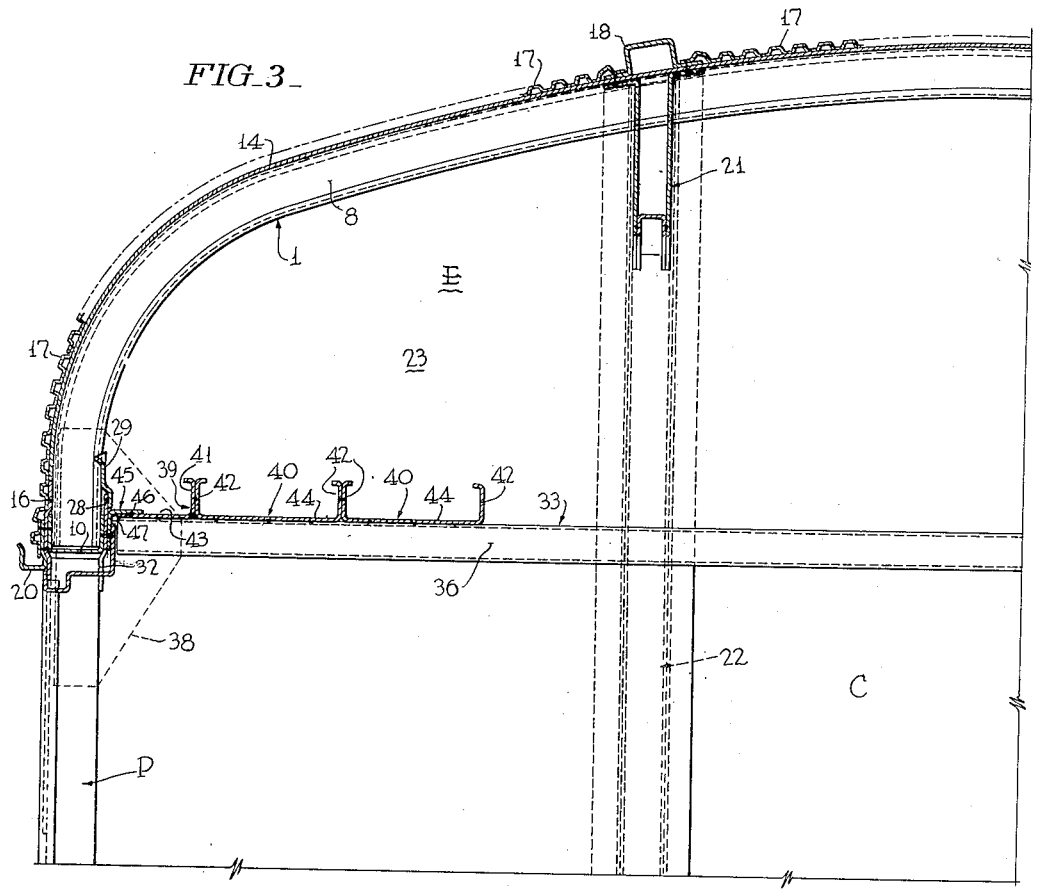
FIG_3_
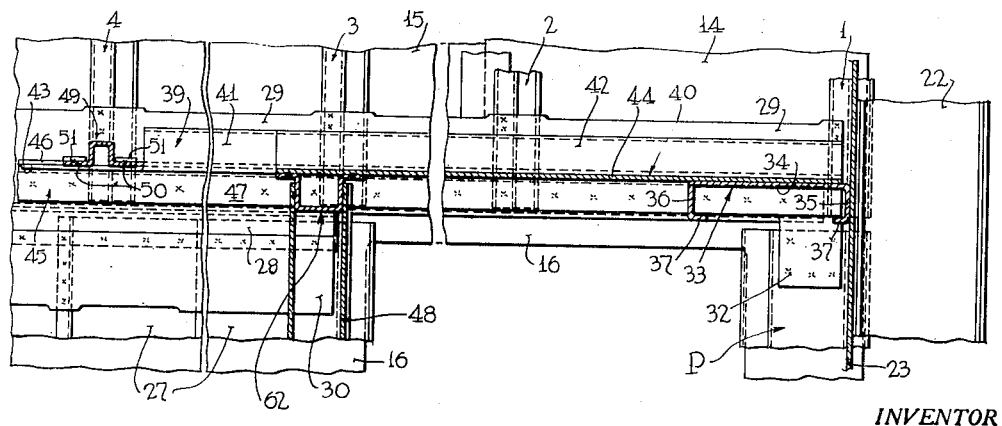
FIG_4_
INVENTOR
Raymond J. Theriault
BY John P. Tarbot
ATTORNEY March 27, 1951  R. J. THERIAULT  2,546,839
REINFORCING STRUCTURE FOR VEHICLE BODIES,
ESPECIALLY FOR RAILWAY CARS Filed March 31, 1945  4 Sheets-Sheet 3

*INVENTOR*
Raymond J. Theriault
BY John P. Tarbox
*ATTORNEY*

March 27, 1951
R. J. THERIAULT
2,546,839
REINFORCING STRUCTURE FOR VEHICLE BODIES,
ESPECIALLY FOR RAILWAY CARS
Filed March 31, 1945
4 Sheets-Sheet 4
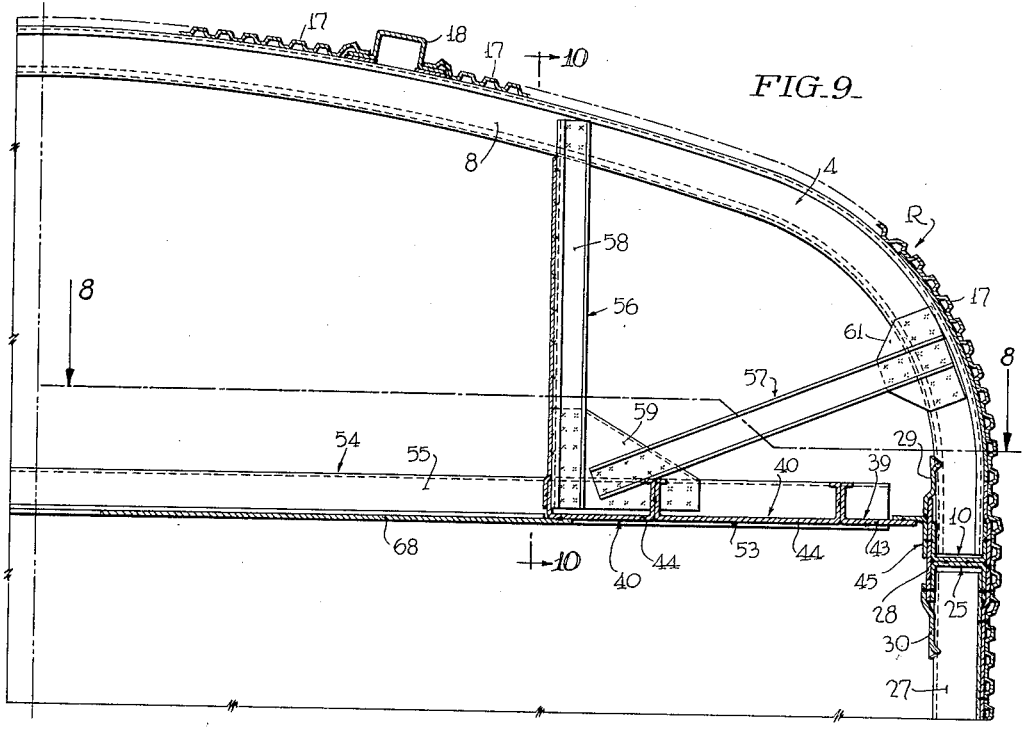
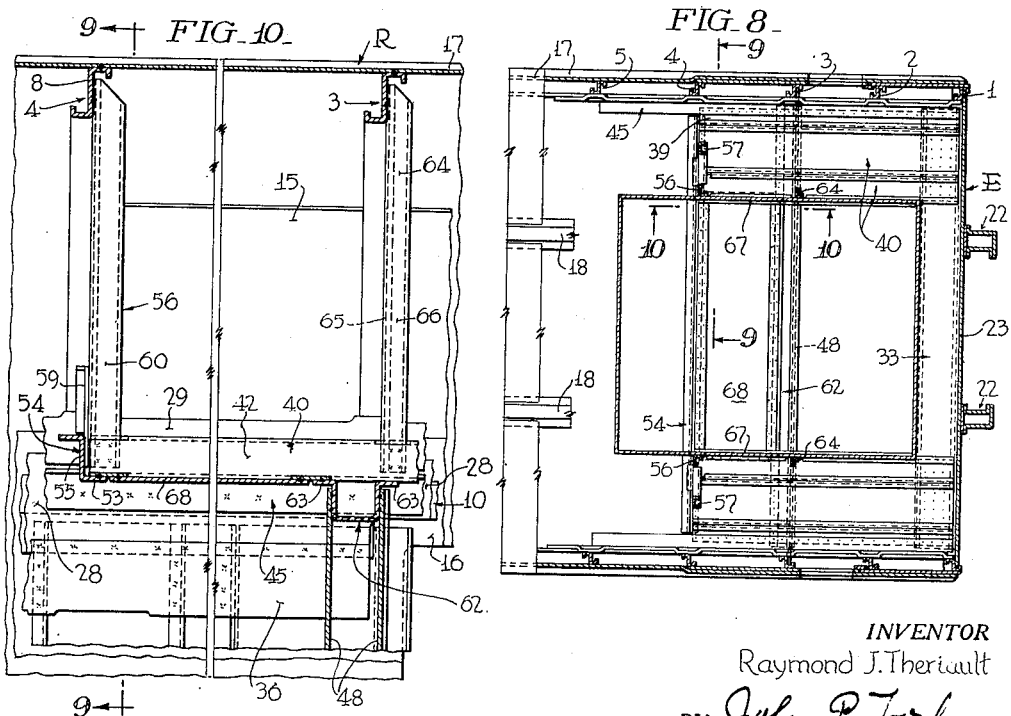
INVENTOR
Raymond J. Theriault
BY John P. Tarbot
ATTORNEY Patented Mar. 27, 1951

2,546,839

UNITED STATES PATENT OFFICE 2,546,839

REINFORCING STRUCTURE FOR VEHICLE BODIES, ESPECIALLY FOR RAILWAY CARS

Raymond J. Theriault, Glenside, Pa., assignor to The Budd Company, Philadelphia, Pa.

Application March 31, 1945, Serial No. 585,908

8 Claims. (Cl. 105—397)

The invention relates to vehicle bodies of the type used for railway cars. More specifically, the invention relates to a vehicle body in which the body side walls and the transversely arched roof are formed as main stress-transmitting elements and are structurally connected with each other, in which an opening, such as a door opening, is provided in one or both side walls, particularly near one or both end walls, and in which an intermediate ceiling panel or plate is secured to the body side walls in the longitudinal regions of and above said opening or openings and is shaped so as to transmit horizontal stresses within its plane.

The main object of the invention is a construction of a vehicle body of the indicated type so as to effectively transmit stresses across the region of the side wall opening or openings into the adjoining portions of the body structure, in particular into the end wall, the roof and the side wall, and so as to transmit heavy shocks from the end wall into the remainder of the structure thereby minimizing the danger of damage in general and of having the end wall pushed into the body in case of accident.

A further object of the invention is to provide a structure achieving the aforesaid main object and forming a support for equipment such as an air-conditioning unit.

The aforesaid objects and advantages of the invention and other objects and advantages are achieved according to the invention by extending the aforesaid stress transmitting intermediate ceiling plate longitudinally beyond the side wall opening or openings and tying such extension into the adjoining wall portions and, if present, interior partition walls or other transverse members.

A specific, advantageous form of the invention comprises longitudinally extending members having angle-section portions which are connected with each other so as to have one of their arms form a substantially horizontal, so-called shear web or panel reinforced by the other longitudinally extending and vertically arranged arms. The structure may alternatively consist of a single horizontally arranged plate or panel reinforced by upstanding webs secured thereto.

The invention and its objects and advantages will be more clearly understood from the embodiments illustrated in the attached drawing and described in the following.

In the drawing:

Fig. 3 is a fragmentary transverse section on a larger scale along lines 3—3 of Figs. 1 and 2;

Fig. 4 is a fragmentary inside elevation and section along line 4—4 of Fig. 2 on a larger scale;

Fig. 8 is a fragmentary small scale sectional plan view similar to Fig. 2 showing a modified construction of the reinforced ceiling, the section being taken along 8—8 of Fig. 9;

Fig. 9 is a fragmentary transverse section along line 9—9 of Fig. 8 on a larger scale; and Fig. 10 is a fragmentary vertical section substantially along lines 10—10 of Figs. 8 and 9.

Figure 1:
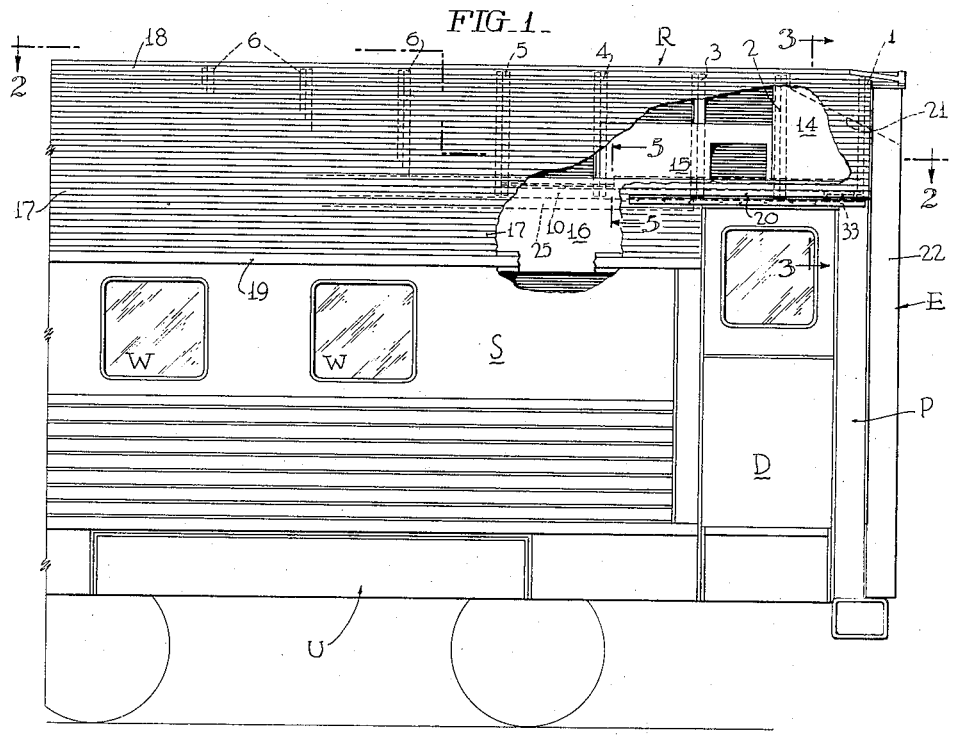
Fig. 1 is a fragmentary side elevation of the vestibule end of a railway car body, certain parts of the interior framework being shown in dotted lines and part of the outer panel being omitted.
Figure 2:
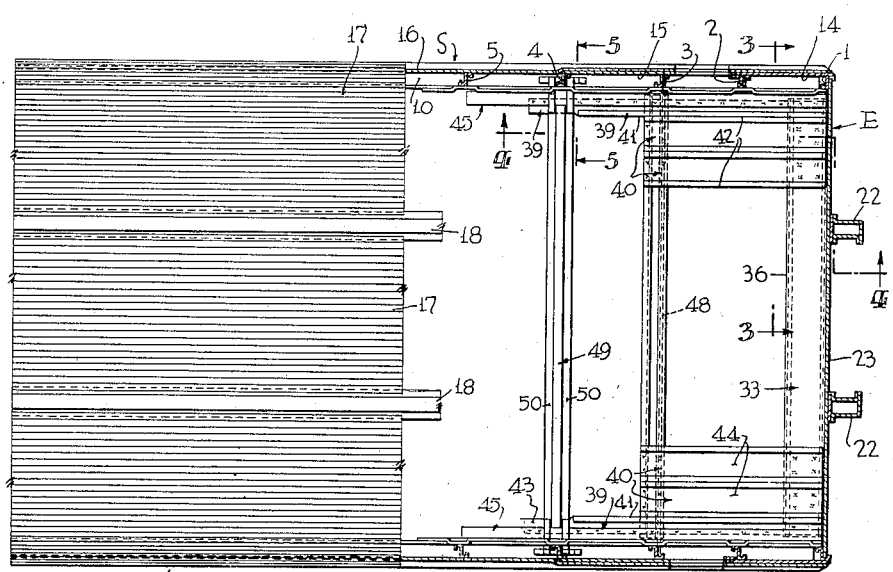
Fig. 2 is a plan view, partly in section along line 2—2 of Fig. 1.
Figures 5, 6:
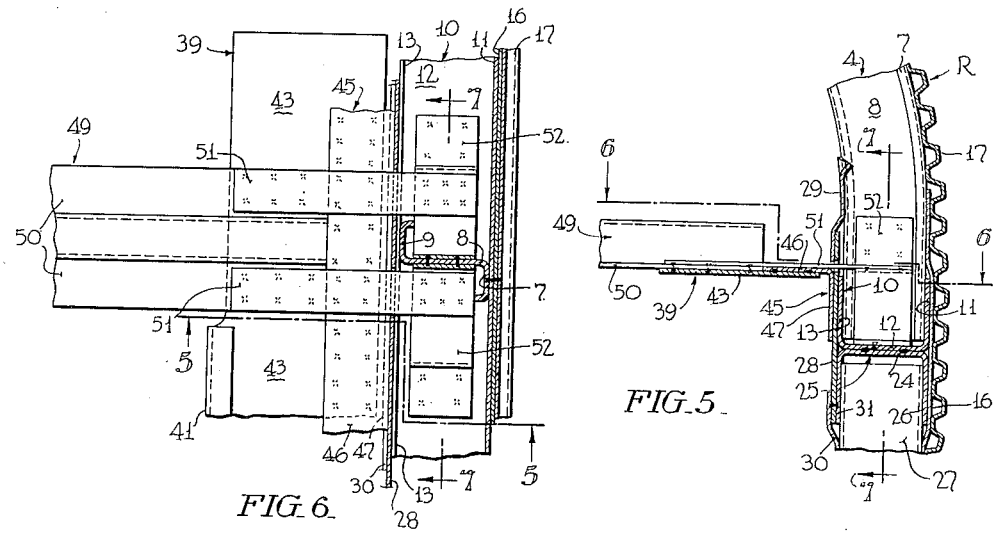
Fig. 5 is a fragmentary section along lines 5—5 of Figs. 1, 2 and 6 on still a larger scale.
Fig. 6 is a fragmentary plan view and section along line 6—6 of and on the same scale as Fig. 5.
Figure 7:
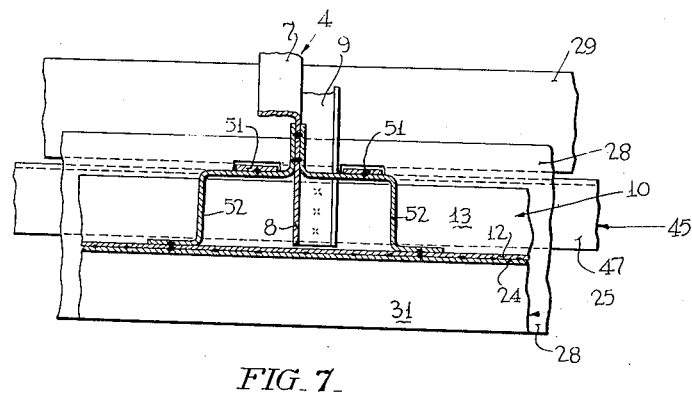
Fig. 7 is a fragmentary section along lines 7—7 of and on the same scale as Figs. 5 and 6.

The general construction of the body illustrated in the drawings may be, but is by no means necessarily, of the type disclosed in Patents 2,504,111 and 2,504,659 issued on April 18, 1950, on the co-pending applications of W. B. Dean, "Body, Especially Roof for Vehicles Such as Railway Cars," Serial No. 585,900, and "Body Side Wall for Vehicles, Especially Railway Cars," Serial No. 585,899, both filed on March 31, 1945, simultaneously with the present application. Such body is composed mainly of an underframe unit U, side wall units S, a roof unit R, end wall units E and end door posts P, and it has windows W, a door and door opening D (Figs. 1 and 4) in the side walls and a communicating door opening C (Fig. 3) in the end wall.

The roof unit R comprises a plurality of Z-section carlines 1, 2, 3, 4, 5 and 6 which may be substantially alike each with an outer arm 7, a web 8 and an inner arm 9. The carlines at the end of the body are differently numbered for convenience of further description of the inventive structure. The downwardly directed ends of the carlines are interconnected on each side by a channel section roof chord member 10 having an outer wall 11, a bottom wall 12 and an inner wall 13. A plate 14 extends over the entire width of the roof and between the two end carlines 1 and 2 and is secured to the outer arms 7 of the latter. A similar plate 15 adjoins and is secured to the plate 14 on each side of the body and extends across and is secured to the carlines 3 and 4.

These plates extend only from the ends of the carlines over substantially the downwardly directed portions thereof. The lower margins of the plates 14 and 15 are adjoined by a panel or web 16 which may extend over the entire length of the body. The outside of the carlines and of the plates 14, 15 and 16 is covered by corrugated sheathing 17, a pair of hat sections 18 and a marginal molding 19, and by a drip channel 20 over each door opening. The hat sections 18 are arranged in line with and are connected at the ends directly and additionally by brackets 21 to the upper ends of the collision posts 22 (Fig. 3) which constitute part of the end wall unit E and are connected to the outside of the end wall panel 23. The latter is secured to the web 8 of the end carline 1.

The roof unit R rests with the bottom walls 12 of its chord members 10 on the bottom walls 24 of the upper chord members 25 of the side wall units S. The reinforcing plate 16 overlaps and is secured to the outside wall 26 of each chord member 25 and the outsides of the vertical side wall posts 27. Longitudinally extending reinforcing strips or plates 28, 29 and 30 are secured to the inside arm 9 of the carlines and the inside walls 13 and 31 of the chord members 10 and 25 respectively, as well as to the inside of the side wall posts 27. The strip 30 ends at the door opening whereas the strips or plates 16 and 29 are cut out at the door opening and have their outer ends connected to the outside and inside, respectively, of the upper end of the door post P; see the downwardly projecting part 32 of the strip 28 in Figure 4.

Most details of the connection between the roof unit and the side wall units, the end posts and the end wall are more fully disclosed in the patents of Walter B. Dean referred to hereinbefore.

The posts P, the lower ends of the carline 1 and the upper ends of the collision posts 22 are interconnected by a transverse inverted channel section beam 33 having a bottom wall 34, side walls 35, 36 and reinforcing flanges 37 (see Fig. 4). The side wall 35 is secured to the inside of the end wall panel 23 and the connections of the ends of the beam 33 to posts P and carline 1 are reinforced by gussets 38 (Fig. 3).

The bottom wall 34 of the beam 33 supports and is secured to the ends of channel and anglesection pans or beams 39, 40 which have their flanged side walls or arms 41, 42 secured to each other and their bottom arms or walls 43, 44 arranged in one plane so as to form a horizontal panel or plate adapted for transmitting stresses in all directions within its plane so as to act as a so-called shear panel or web. The arm 43 of the outside member 39 is secured to the one arm 46 of an angle section member 45, the other arm 47 of which is secured to the longitudinal reinforcing strip 28 of the roof panel.

The construction as described so far is substantially the same for both embodiments.

In the embodiment illustrated in Figs. 1 to 7, the outer members 39 extend from the end wall to a point inboard of the carline 4 whereas the angle section member 45 extends to the carline 5. The two inner members 40 on each side extend from the end wall to the carline 3 and are supported by the upper margin of the vestibule partition wall 48 (see Fig. 4). The inboard ends of the members 39 have their upstanding arms 41 cut away to make room for a transverse beam 49 which interconnects the lower ends of the carline 4. The member 49 is a downwardly facing hat section which has its marginal flanges 50 attached to the horizontal arms 43 of members 39 and to strips 51. The latter are secured also to the arm 46 of the angle section member 45 and to stepped brackets 52 which have their ends secured to the bottom wall 12 of chord member 10 and to the web 8 of carline 4 as clearly shown in Figs. 5, 6 and 7.

The plate, web, or panel formed by the members 39 and 40 and the connecting angle section member 45 might also be formed in a different manner such as for instance, by a single horizontally arranged plate to which separate upstanding reinforcing webs are secured, or the member 39 may have a downwardly extending flange along its outer margin for direct connection to the roof or side wall.

In the embodiment illustrated in Figs. 8 to 10, the members 39, 40 and 45 extend from the end wall to carline 4 and have their inboard ends supported by and secured to the lower horizontally arranged arm 53 of a transverse Z-section beam 54 which has its web 55 arranged in the same plane with the web 8 of carline 4. The members 45 extend in this embodiment also to the carline 5. The beam 54 is suspended from the carline 4 on each side by a vertical brace 56 and an inclined brace 57. The brace 56 has one of its arms 58 attached to the webs 8 and, through a gusset plate 59, to the web 55, whereas the second arm 60 is secured to the innermost wall of the inner beam 40. The brace 57 has its bottom wall secured respectively to the gusset plate 59 and to the web 8 of the carline 4 which latter connection may also be reinforced by a gusset plate 61.

Also in this embodiment, the stress-transmitting panels or plates formed by the members 39, 40 and 45 are supported between their ends by the partition wall 48 which in both embodiments is provided along its upper margin with an inverted hat section 62, the flanges 63 of which overlap the underside of and are secured to the walls or arms 43, 44 and 46 of said members.

A second angle section brace 64 is arranged on each side between the carlines 3 and the respective inner member 40 and has its one arm 65 secured to the web 8 of the carline 3 and its outer arm 66 secured to the innermost wall 42 of the inner pan 40. The arms 60 and 66 of the members 56 and 64 serve also for the attachment of the side walls 67 of a chamber for the reception of an air conditioning unit which is accessible through the opening between the two lateral structures 39, 40, the end wall E and the partition wall 48.

A panel 68 is inserted between the two inner lateral beams 40 and between the transverse beams 54 and 62 and is secured to the bottom walls 44, arms 53 and flanges 63 of these beams. The beams 39, 40 and 45 and the panel 68 constitute together a large continuous stress-transmitting panel or plate which extends over the entire width of the car and surrounds the aforesaid opening for giving access to the air conditioning unit or other accessories located in the space between roof and shear panel.

Although the invention is especially useful at the location illustrated in the drawing, that is, over the side wall openings adjacent the end wall of the body, similar shear panel or plate constructions may also be arranged at the nonvestibule end of a body or over window openings or door openings located in a middle region of the body. In all cases, the panel or plate will effectively transmit the stresses from the end wall or from one side of the opening to the other and distribute them over a wide area of the adjoining roof or side wall portions.

The illustrated embodiments are especially adapted for the manufacture from high tensile sheet metal such as cold worked austenitic stainless steel or the like, and the members entering into the constructions lend themselves especially for the fabrication from such material in strip form as well as to their connection by spot or seam welding. While the connecting means have not been specifically pointed out in each instance, it should be understood that electric spot or seam welding is contemplated throughout. Many of the welds are indicated in the drawing by asterisks, or, in the sectional views, by heavy black dots.

The invention is not restricted to the illustrated embodiments but the attached claims are directed to all constructions embodying the principles of the invention unless specifically restricted.

What is claimed is:

1. In a vehicle body having a side wall, a roof and an end wall, all constituting main stress-transmitting members of the body structure, a door opening in the side wall adjacent said end wall, and a stress-transmitting plate structure arranged horizontally above the door opening but below the middle portion of the roof, said plate structure being shaped and designed for the transmission of stresses in all horizontal directions within its plane, said plate structure projecting in longitudinal direction into the interior of the body beyond said door opening and being stress-transmittingly connected to said end wall, to said side walls above the door opening and beyond said door opening in inboard direction, and to a transverse structure member spaced in inboard direction from said door opening and arranged at about the level of the upper margin of the door opening.

2. In a railway car, side walls and an end wall, a transversely arched roof connected along its lower margins to the upper margins of the side walls and at its end to the end wall which latter is reinforced by vertical collision posts, a door opening adjacent said end wall in each of the side walls, a transverse beam interconnecting the side margins of the roof and the upper ends of outboard door posts and secured to the end wall with its collision posts and having its middle portion spaced from the end margin of the roof, a pair of transverse structures arranged at least in part at about the same level as the first-named transverse beam but inboard of said door openings and longitudinally spaced from each other, longitudinally and transversely extending generally planar horizontal plate structures connected with said transverse beam and both said transverse structures and furthermore connected with the roof and side walls above and adjacent the upper margins of the door openings, said generally planar horizontal plate structures being shaped and designed for sustaining horizontal stresses in all directions for the purpose of transmitting stresses from the end wall across the door openings into the inboard portions of the side walls and the roof.

3. In a vehicle body, side walls, a transversely arched roof merging with its marginal portions into the side walls, an opening in at least one of said side walls, an intermediate ceiling structure in the shape of a plate formed as a main horizontal stress transmitting element arranged substantially horizontally above and adjacent the upper margin of said opening and extending longitudinally across and beyond the region of the opening, said ceiling structure being stress-transmittingly secured to said roof and side walls by its outer longitudinal margins and to transverse members interconnecting the opposite body sides at or near the level of the upper margin of the opening, said plate being constructed and serving for the longitudinal and diagonal transmission of stresses across the portion of the body weakened by said opening.

4. In a vehicle body comprising side walls interconnected by a roof, an opening in at least one of said side walls, an intermediate ceiling structure presenting a plate arranged horizontally above and adjacent the upper margin of said opening and extending longitudinally across and beyond the location of the opening, said plate being secured to the body side wall provided with the opening and to transverse members interconnecting the opposite body side walls at least two of said transverse members being arranged on one side of the opening and spaced from each other in the longitudinal direction of the body, said plate being constructed in cooperation with the transverse members for the transmission of longitudinal, transverse, and diagonal horizontal stresses in and beyond the region of the opening.

5. In a vehicle body, a transversely arched roof merging into adjoining side walls and connected to an end wall, an opening provided in the side wall adjacent said end wall, a plate arranged below the roof and above and adjacent the upper margin of the opening and extending inboard beyond the opening, said plate being formed for transmission of stresses in all directions within its plane and being structurally connected to the end wall, to the side walls and the roof and to a transverse member extending between the side margins of the roof and the upper margins of the side walls, said plate having a greater length adjacent its longitudinal sides than spaced from the latter toward the longitudinal center of the body.

6. In a vehicle body of the type having as main stress-transmitting elements structurally interconnected side walls and a transversely arched roof, at least one of its side walls defining an opening, a stress-transmitting intermediate ceiling plate structure interconnecting the side walls in the region of said side opening and having its mid-portion spaced from the mid-portion of the roof; the provision of an extension of said intermediate ceiling plate structure beyond the longitudinal region of said opening and the structural connection of such extension with the body side wall provided with said opening for the purpose of transmitting and distributing stresses from said ceiling plate structure into the body side wall adjacent said opening.

7. In a railway car body of the type having as main stress-transmitting elements structurally interconnected side walls, an end wall and a transversely arched roof, an opening in at least one of the body side walls adjacent the end wall, and an intermediate ceiling plate of the type adapted for transmitting stresses in its plane, which ceiling plate is structurally secured along its one transverse margin and along its longitudinal side margins to said end wall and said side walls respectively, in combination with an extension of said ceiling plate in longitudinal direction away from said end wall beyond the region of the opening and the structural connection of such extension with the side wall provided with said opening in the region adjoining said opening so that the ceiling plate will transmit and distribute stresses from the end wall across the opening into adjoining portions of said wall and roof.

8. In a railway car body of the type having side walls at least one of which defines a door opening, a transversely arched roof, the side walls and roof constituting main stress-transmitting elements of the body and being structurally connected with each other, and a horizontally arranged plate located in the longitudinal region of and above said opening, said plate being adapted for transmitting stresses in its plane and being structurally connected along its longitudinal side margins with said body side walls; the combination with a longitudinal extension of said plate beyond the longitudinal region of said opening, and a structural connection between the longitudinal side margin of such extension with the body side wall provided with said opening in the region adjoining such opening, for the purpose of transmitting stresses through said plate across and beyond the region of the opening into adjoining regions of said side walls and roof.

RAYMOND J. THERIAULT.

REFERENCES CITED

The following references are of record in the file of this patent:

UNITED STATES PATENTS

| Number | Name | Date |
| --- | --- | --- |
| 839,857 | Kiesel | Jan. 1, 1907 |
| 1,055,615 | Dean | Mar. 11, 1913 |
| 1,249,121 | Koch | Dec. 4, 1917 |
| 1,381,284 | Cotton | June 14, 1921 |
| 1,724,149 | Self | Aug. 13, 1929 |
| 2,143,547 | Dean | Jan. 10, 1939 |
| 2,223,746 | Stoner | Dec. 3, 1940 |